(12) United States Patent
Moyer et al.

(10) Patent No.: US 10,236,718 B2
(45) Date of Patent: Mar. 19, 2019

(54) WIRELESS HARVESTING HEADER CONNECTION

(71) Applicant: CNH Industrial America LLC, New Holland, PA (US)

(72) Inventors: Terry S. Moyer, Denver, PA (US); Daniel Reed, Brownstown, PA (US)

(73) Assignee: CNH Industrial America LLC, New Holland, PA (US)

( * ) Notice: Subject to any disclaimer, the term of this patent is extended or adjusted under 35 U.S.C. 154(b) by 450 days.

(21) Appl. No.: 14/885,442

(22) Filed: Oct. 16, 2015

(65) Prior Publication Data

US 2017/0110908 A1    Apr. 20, 2017

(51) Int. Cl.
*A01B 59/06* (2006.01)
*A01B 51/02* (2006.01)
(Continued)

(52) U.S. Cl.
CPC ............ *H02J 50/10* (2016.02); *A01B 51/026* (2013.01); *A01B 59/002* (2013.01); *A01B 59/06* (2013.01);
(Continued)

(58) Field of Classification Search
CPC .... A01D 41/141; A01B 51/02; A01B 51/026; A01B 59/002; A01B 59/06; A01B 76/00; H02J 50/10; H02J 50/12; H02J 50/80
See application file for complete search history.

(56) References Cited

U.S. PATENT DOCUMENTS 7,022,012 B2    4/2006 Heinsey et al.
7,430,846 B2    10/2008 Bomleny et al.
(Continued)

FOREIGN PATENT DOCUMENTS

DE         44 12 116 A1       10/1995
DE     102012111029 A1 *    5/2014     .......... G07C 5/0841
(Continued)

OTHER PUBLICATIONS

International Search Report and Written Opinion for International Application No. PCT/US2016/056847, dated Jan. 26, 2017 (11 pages).

*Primary Examiner* — Ryan Johnson
(74) *Attorney, Agent, or Firm* — Peter K. Zacharias; Patrick M. Sheldrake

(57) ABSTRACT

An agricultural machine and attachment combination has a wireless attachment connection for transmitting electronic information, commands, and electric power between the agricultural machine and attachment. An agricultural machine side control system having a wireless interface is connected to the agricultural machine and an attachment side control system having a wireless interface is connected to the attachment. Each interface has at least one inductively coupled communication receiver and at least one inductively coupled communication transmitter. The transmitters and receivers cooperate to transmit electronic information and commands between the agricultural machine side control system and the attachment side control system. A primary coil is connected to the agricultural machine for transmitting power to the attachment. A secondary coil is connected to the attachment for receiving power from the agricultural machine. The primary coil and the secondary coil cooperate to transmit power from the agricultural machine to the attachment using inductance.

18 Claims, 3 Drawing Sheets

(51) Int. Cl.
  *H02J 50/10* (2016.01)
  *A01B 59/00* (2006.01)
  *H04W 4/80* (2018.01)
  *A01B 76/00* (2006.01)
  *H02M 3/24* (2006.01)
  *H04B 5/00* (2006.01)
  *A01D 41/127* (2006.01)

(52) U.S. Cl.
  CPC ............ *A01B 76/00* (2013.01); *A01D 41/127* (2013.01); *H02M 3/24* (2013.01); *H04B 5/0037* (2013.01); *H04B 5/0081* (2013.01); *H04W 4/80* (2018.02)

(56) References Cited

U.S. PATENT DOCUMENTS

| | | | |
|---|---|---|---|
| 7,987,656 B2 | 8/2011 | Ehrhart et al. | |
| 7,992,374 B1 | 8/2011 | Bich et al. | |
| 8,224,534 B2 | 7/2012 | Kowalchuk | |
| 8,831,512 B2 | 9/2014 | Laws et al. | |
| 9,706,708 B2 * | 7/2017 | Smith | A01D 41/127 |
| 2009/0107094 A1 | 4/2009 | Bich et al. | |
| 2012/0235636 A1* | 9/2012 | Partovi | H02J 7/025 320/108 |
| 2013/0167227 A1* | 6/2013 | Miura | E02F 9/2054 726/19 |
| 2014/0266253 A1 | 9/2014 | Acheson et al. | |

FOREIGN PATENT DOCUMENTS

| | | | |
|---|---|---|---|
| EP | 2902957 A1 | 8/2015 | |
| JP | 2011217742 A | * 11/2011 | |
| JP | 2014158506 A | * 9/2014 | |
| WO | 2015048499 A1 | 4/2015 | |
| WO | 2015082966 A1 | 6/2015 | |

\* cited by examiner

WIRELESS HARVESTING HEADER CONNECTION

BACKGROUND OF THE INVENTION

1. Field of the Invention

The present invention relates to agricultural machines such as combines, forage harvesters, windrowers, harvesting machines, crop preparation machines, tractors, and implements, and, more particularly, to an agricultural machine and attachment combination having a wireless connection between the agricultural machine and the attachment allowing for transmission of both electronic communication and electric power.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves in order to discharge chaff and other debris toward the rear of the combine. Non-grain crop material such as straw from the threshing section proceeds through a straw chopper and out of the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

Combines use various types of headers for various types of crops, and the header is often detached from the combine, either to change header types, or simply to allow the combine to travel on road. These headers have various actuators, motors, sensors, and/or controllers used to perform the functions of the header. In order to provide electrical communication between the combine and the header, it is known to use a connector arrangement between the two, which provides electrical contact in order to transmit electronic information and/or electrical power. Such connector arrangements tend to be susceptible to breakage, wear, and failure due to contamination. Particularly, it is common for the connector arrangement to be forgotten by an operator when the header is detached from the combine, so that the components of the connector arrangement are damaged when the combine is moved away from the header. Repair and/or replacement of these components can be time consuming and costly, both in terms of repair costs and in terms of downtime.

Other agricultural machines such as forage harvesters, windrowers, harvesting machines, and crop preparation machines also have connector arrangements between the agricultural machine and attachments such as headers, which connector arrangements are also susceptible to breakage, wear, and failure due to contamination or due to being forgotten when the attachment is removed from the agricultural machine. Furthermore, agricultural tractors and towed agricultural implements have connector arrangements with similar vulnerabilities.

It is further known to provide wireless communication between an agricultural machine and its attachment, such as between a combine and its header. However, such wireless connections typically use electromagnetic communication, such as radio, which are susceptible to interference or cross-talk. These known forms of wireless communication between an agricultural machine and its attachment are particularly unsuitable for conditions in which more than one agricultural machine is used in a given area. Under these circumstances, the agricultural machines may communicate with an attachment connected to another agricultural machine, so that incorrect information is communicated between the agricultural machines and attachments.

What is needed is a way to provide electrical communication for the transmission of electronic information and/or electrical power between a combine and its header, or between any agricultural machine and its attachment, or between agricultural tractors and towed agricultural implements, without the attendant susceptibility to breakage, wear, and failure due to contamination associated with known connector arrangements, and without the attendant susceptibility to interference and cross-talk associated with known wireless connections between agricultural machines and attachments.

SUMMARY OF THE INVENTION

Embodiments of the present invention provide such electronic communication for the transmission of electronic information and commands, and/or communication of electrical power between an agricultural machine and its attachment, such as between a combine and its header, or between an agricultural tractor and towed agricultural implements, without the susceptibility to breakage, wear, and failure due to contamination, using a wireless header connection. The wireless attachment connection has an interface that uses an inductively coupled form of communication, such as Near Field Communication (NFC) protocol, as a non-limiting example, to exchange electronic information and commands between an agricultural machine side control system and an attachment side control system regarding, for example in the embodiment of a combine and header combination, header height, row guidance, reel position, flotation pressure, and header type, as non-limiting examples. Additionally, the attachment side control system may provide the agricultural machine side control system with software drivers for operating coils, actuators, or motors used in the attachment.

The attachment side control system may further provide the agricultural machine side control system with specific identifying information regarding the attachment, such as attachment type, model, and serial number, thereby allowing the use of various attachments without requiring the operator to manually reconfigure the attachment type in the agricultural machine side control system when changing attachments. The attachment side control system may also be provided with an attachment hour meter, accumulated hour information from which may also be provided to the agricultural machine side control system using the wireless attachment connection, thereby allowing for more accurate tracking of accumulated operating hours on the attachment.

Embodiments of the present invention may further provide the ability to transmit power wirelessly between the agricultural machine and the attachment using a primary coil and secondary coil arranged to transmit electrical power inductively, or using other arrangements bringing inductive coils into close proximity, thereby transmitting electrical power using inductance. Such embodiments may include a paddle and port arrangement, wherein the primary coil is contained within a paddle that fits into a port containing the secondary coil, in order to provide close and secure proximity between the coils for effective inductive power transfer. Alternately, the primary coil may be contained within the port and the secondary coil contained within the paddle. Such embodiments may alternately include flat plates containing the primary and secondary coils, which abut when the attachment is attached to the agricultural machine, thereby facilitating effective inductive power transfer between the coils. A direct current (DC) to alternating current (AC) converter converts agricultural machine DC power, such as 12 or 24 volts DC, to AC suitable to operate the primary coil, which then transmits that power to the secondary coil through inductance. The AC power from the secondary coil is then converted back to DC by an attachment AC to DC rectifier converter, which may further include a voltage regulator, for use by the attachment side control system and other electrical systems of the attachment.

The invention in one form is directed to an agricultural machine and attachment combination having a wireless attachment connection for transmitting electronic information, commands, and electric power between the agricultural machine and the attachment. The wireless attachment connection has an agricultural machine side control system connected to the agricultural machine and an attachment side control system connected to the attachment. An agricultural machine side interface is connected to the agricultural machine side control system, and has at least one agricultural machine side inductively coupled communication receiver and at least one agricultural machine side inductively coupled communication transmitter. An attachment side interface is connected to the attachment side control system, and has at least one attachment side inductively coupled communication receiver and at least one attachment side inductively coupled communication transmitter. The agricultural machine side inductively coupled communication transmitter and the attachment side inductively coupled communication receiver cooperate to transmit electronic information and commands from the agricultural machine side control system to the attachment side control system. The attachment side inductively coupled communication transmitter and the agricultural machine side inductively coupled communication receiver cooperate to transmit electronic information from the attachment side control system to the agricultural machine side control system. A primary coil is connected to the agricultural machine for transmitting power to the attachment. A secondary coil is connected to the attachment for receiving power from the agricultural machine. The primary coil and the secondary coil cooperate to transmit power from the agricultural machine to the attachment using inductance.

The invention in another form is directed to a wireless attachment connection for transmitting electronic information, commands, and power between an agricultural machine and an attachment. The wireless attachment connection has an agricultural machine side control system connected to the agricultural machine and an attachment side control system connected to the attachment. An agricultural machine side interface is connected to the agricultural machine side control system, and has at least one agricultural machine side inductively coupled communication receiver and at least one agricultural machine side inductively coupled communication transmitter. An attachment side interface is connected to the attachment side control system, and has at least one attachment side inductively coupled communication receiver and at least one attachment side inductively coupled communication transmitter. The agricultural machine side inductively coupled communication transmitter and the attachment side inductively coupled communication receiver cooperate to transmit electronic information and commands from the agricultural machine side control system to the attachment side control system. The attachment side inductively coupled communication transmitter and the agricultural machine side inductively coupled communication receiver cooperate to transmit electronic information from the attachment side control system to the agricultural machine side control system. A primary coil is connected to the agricultural machine for transmitting power to the attachment. A secondary coil is connected to the attachment for receiving power from the agricultural machine. The primary coil and the secondary coil cooperate to transmit power from the agricultural machine to the attachment using inductance.

The invention in another form is directed to a method of transmitting electronic information, commands, and electric power between an agricultural machine and an attachment. The method includes several steps. The first step is providing an agricultural machine side control system connected to the agricultural machine and an attachment side control system connected to the attachment. The second step is providing a wireless attachment connection having an agricultural machine side interface connected to the agricultural machine side control system. The agricultural machine side interface has at least one agricultural machine side inductively coupled communication receiver and at least one agricultural machine side inductively coupled communication transmitter. The wireless attachment connection further has an attachment side interface connected to the attachment side control system. The attachment side interface has at least one attachment side inductively coupled communication receiver and at least one attachment side inductively coupled communication transmitter. The third step is using the agricultural machine side inductively coupled communication transmitter and the attachment side inductively coupled communication receiver to transmit electronic information and commands from the agricultural machine side control system to the attachment side control system. The fourth step is using the attachment side inductively coupled communication transmitter and the agricultural machine side inductively coupled communication receiver to transmit electronic information from the attachment side control system to the agricultural machine side control system. The electronic information and commands include at least one of a commanded attachment height, a current attachment height, row guidance, a commanded reel position, a current reel position, a commanded flotation pressure, a current flotation pressure, an attachment type, an attachment model, an attachment serial number, current attachment hours, and software drivers. The fifth step is providing a primary coil connected to the agricultural machine. The sixth step is providing a secondary coil connected to the attachment. The seventh step is using the primary coil and the secondary coil to transmit power between the agricultural machine and the attachment by way of inductance.

One advantage of the present invention is that it allows for the transmission of electronic information, commands, and/or electrical power between an agricultural machine and its attachment, such as between a combine, forage harvester, windrower, harvesting machine, or crop preparation machine and a header, or such as between an agricultural tractor and towed agricultural implement, without the susceptibility to breakage, wear, and failure due to contamination associated with known connector arrangements.

Another advantage is that the present invention eliminates costly repairs and downtime that occur when an operator forgets to disconnect a known connector arrangement, resulting in breakage of the connector and/or its wire harnesses.

Still another advantage is that the present invention allows for reliable transmission of electronic information, commands, and/or electrical power between an agricultural machine and its attachment, without losses or interruption due to poor connections.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "forward", "rearward", "left" and "right", when used in connection with the agricultural machine and/or components thereof are usually determined with reference to the direction of forward operative travel of the agricultural machine, but again, they should not be construed as limiting. The terms "longitudinal" and "transverse" are determined with reference to the fore-and-aft direction of the agricultural machine and are equally not to be construed as limiting.

Figure 1:
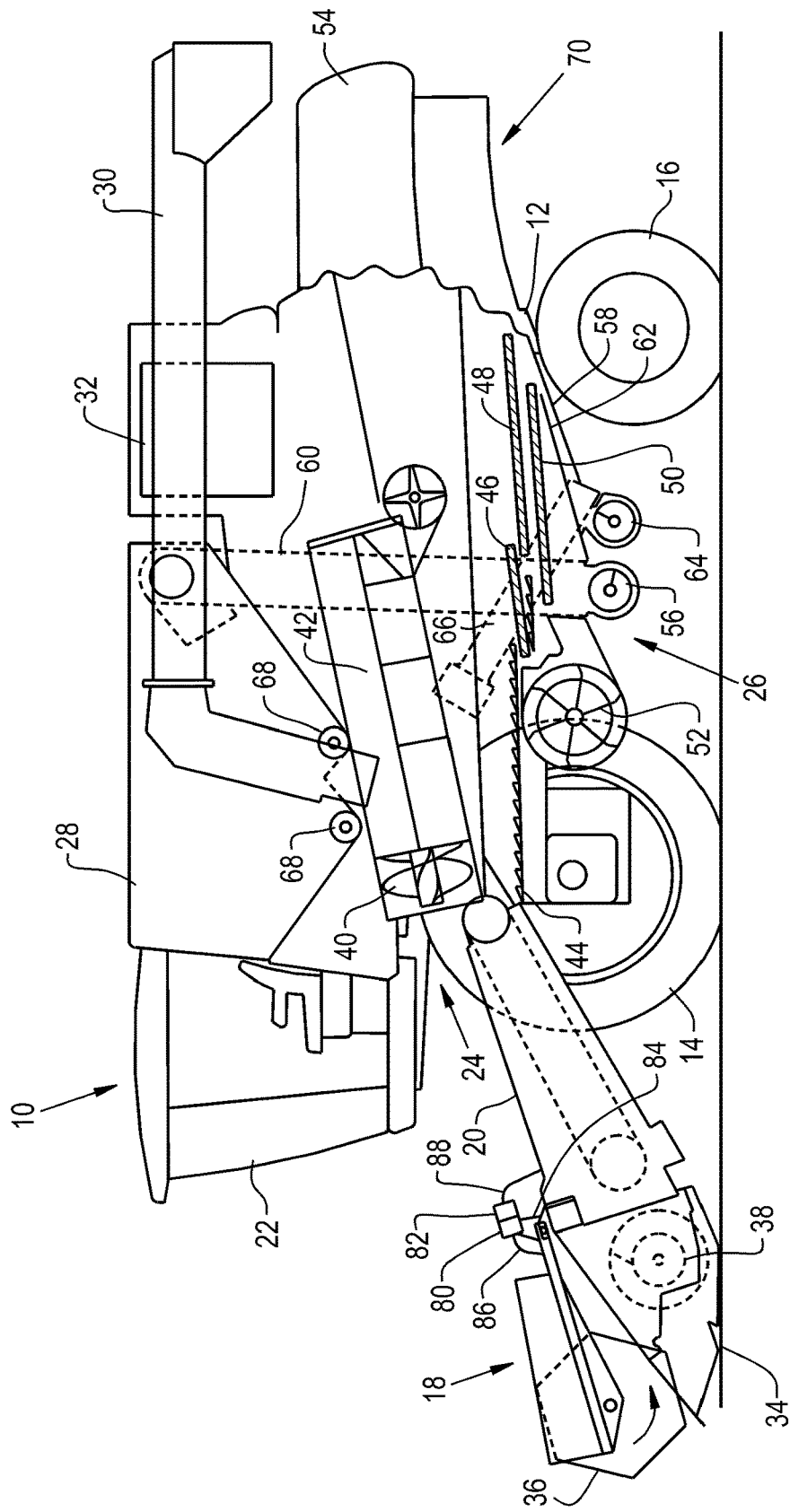
FIG. 1 illustrates a side view of a harvester combine with an attached header.
Figure 2:
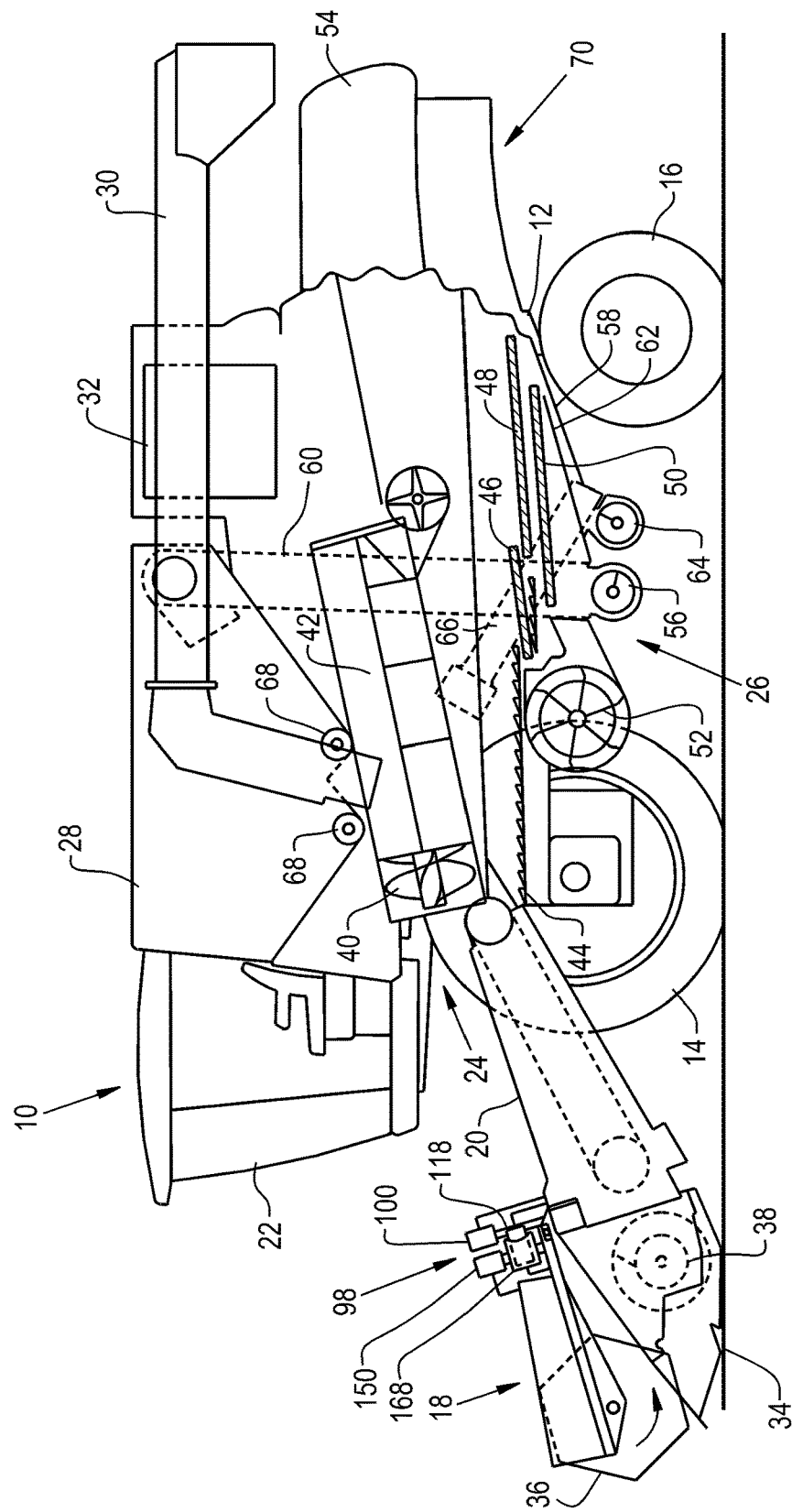
FIG. 2 illustrates a side view of a harvester combine with an attached header having a wireless attachment connection according to one embodiment of the invention.

Referring now to the drawings, and more particularly to FIGS. 1 and 2, there is shown an agricultural machine in the form of a combine 10, which generally includes a chassis 12, ground engaging wheels 14 and 16, an attachment in the form of a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is removably mounted to the front of the combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain that has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52, which provides an airflow through the sieves, to remove chaff and other impurities such as dust from the grain by making this material airborne for discharge from straw hood 54 of residue handling system 70 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

The combine 10 shown in FIG. 1 shows a known connector arrangement between the combine 10 and the header 18, wherein the combine 10 is provided with a male combine side connector 82 with sockets (not shown) that is linked to the combine 10 by a combine wire harness 88. The header 18 is provided with a female header side connector 80 with pins (not shown) that is linked to the header 18 by a header wire harness 86, and which mates to the male combine side connector 82. The female header side connector 80 is fixedly mounted to the header 18 by way of a connector mounting 84, whereas the male combine side connector 82 is not fixedly mounted but is located at the end of the combine wire harness 88 which remains loose so that the connection can be made manually by inserting the male combine side connector 82 into the female header side connector 80. The male combine side connector 82 and the female header side connector 80 may be a 31 pin Deutsch brand connector, in which the connection is made manually by aligning a key tab (not shown) on both connector bodies and then turning a locking ring (not shown) while simultaneously pushing the male combine side connector 82 into the female header side connector 80.

Such connector arrangements as shown in FIG. 1 tend to be susceptible to breakage, wear, and failure due to contamination. Frequently, when the header 18 is detached from combine 10, the operator forgets to detach the male combine side connector 82 from the female header side connector 80, so that when the combine 10 is backed away from the header 18, the female header side connector 80, the connector mounting 84, the header wire harness 86, the male combine side connector 82, and/or the combine wire harness 88 gets damaged. Repair and/or replacement of these components can be time consuming and costly, both in terms of repair costs and in terms of downtime. Additionally, as the male combine side connector 82 is installed and removed normally, the contacts of both male combine side connector 82 and female header side connector 80 wear and eventually the pin contacts (not shown) of the male combine side connector 82 bend over and short out against other pins, or break off entirely. Furthermore, the environment at the rear of the header 18 and at the front of the feeder housing 20 where the connector arrangement is located is not conducive to keeping a connector clean and dry. As a result, dirt, chaff, oil, and moisture frequently contaminate the male combine side connector 82 and female header side connector 80, resulting in poor connections and requiring the connection to be cleaned out at regular intervals.

The agricultural machine in the form of a combine 10 shown in FIG. 2 shows an embodiment of the present invention, a wireless attachment connection 98. The wireless attachment connection 98 includes an agricultural machine interface 100 and an agricultural machine primary coil 118, which may be in the form of a paddle, a port, or a flat plate, as non-limiting examples. The agricultural machine primary coil 118 is fixedly or resiliently attached to the agricultural machine 10, in this case to the feeder housing 20 of the combine 10, such as by use of a bracket, rubber mount, spring, or other rigid or semi-rigid arrangement. The wireless attachment connection 98 further includes an attachment interface 150 and an attachment secondary coil 168, which may be in the form of a port, a paddle, or a flat plate, as non-limiting examples. The attachment secondary coil 168 is fixedly or resiliently attached to the attachment, in this case in the form of header 18, such as by use of a bracket, rubber mount, spring, or other rigid or semi-rigid arrangement. The agricultural machine interface 100 and the attachment interface 150 are brought into close proximity, preferably 10 centimeters or less, even more preferably 4 centimeters or less, when the attachment is attached to the agricultural machine, in this case when the header 18 is attached to the feeder housing 20. The agricultural machine interface 100 and the attachment interface 150, upon being brought into close proximity, together function to provide a communication interface using an inductively coupled form of communication, such as Near Field Communication (NFC) protocol, as a non-limiting example, between the agricultural machine and the attachment, in this case between the combine 10 and the header 18.

The agricultural machine primary coil 118 and the attachment secondary coil 168 cooperate to provide wireless transmission of electrical power between the agricultural machine and the attachment, in this case between the fecombine 10 and the header 18, using inductance. In the embodiment shown, the agricultural machine primary coil 118 is in the form of a paddle, and the attachment secondary coil 168 is in the form of a port. However, it is contemplated that the agricultural machine primary coil 118 may be in the form of a port, and the attachment secondary coil 168 may be in the form of a paddle. Still alternately, each of the agricultural machine primary coil 118 and the attachment secondary coil 168 may be in the form of flat plates, which face each other when the attachment is attached to the agricultural machine, in this case when the header 18 is attached to the feeder housing 20, thereby providing wireless inductive transmission of electrical power between the combine 10 and the header 18. In this way, the function of the connector arrangement shown in FIG. 1 is fulfilled by the wireless attachment connection 98 according to an embodiment of the present invention as shown in FIG. 2, without the susceptibility to breakage, wear, and failure due to contamination.

Figure 3:
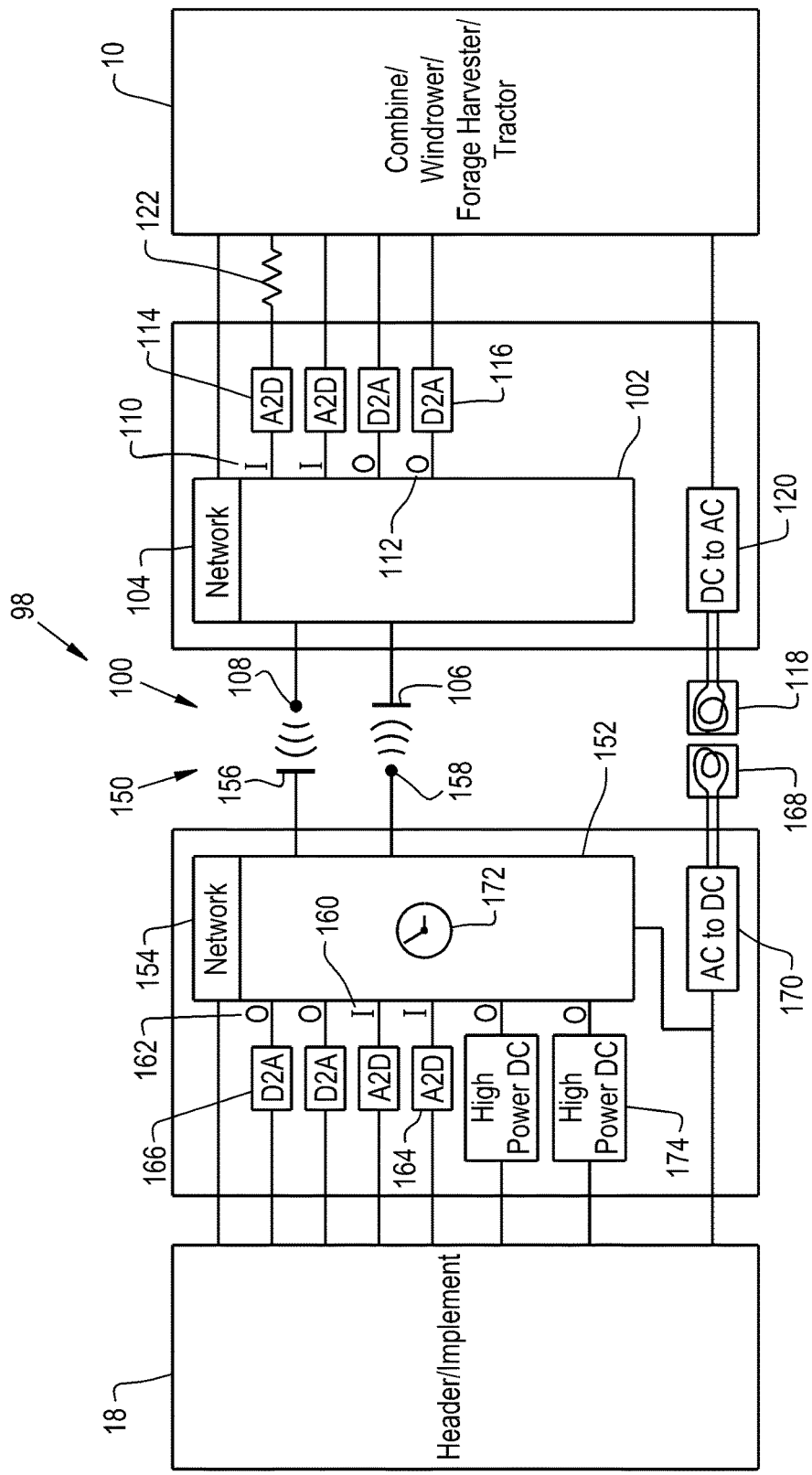
FIG. 3 illustrates a graphical representation of the wireless attachment connection according to an embodiment of the invention.

Turning now to FIG. 3, an embodiment of the wireless attachment connection 98 is shown in graphical representation in further detail. The wireless attachment connection 98 includes an agricultural machine side control system 102 connected to agricultural machine 10, which is then connected to an agricultural machine side interface 100. The wireless attachment connection 98 also includes an attachment side control system 152 connected to the attachment 18, which is then connected to an attachment side interface 150. The agricultural machine side interface 100 includes at least one agricultural machine side inductively coupled communication receiver 106 and at least one agricultural machine side inductively coupled communication transmitter 108 connected to the agricultural machine side control system 102, as well as an agricultural machine primary coil 118. Similarly, the attachment side interface 150 includes at least one attachment side inductively coupled communication receiver 156 and at least one attachment side inductively coupled communication transmitter 158 connected to the attachment side control system 152, as well as an attachment secondary coil 168.

The agricultural machine side control system 102 is connected to the agricultural machine 10 by way of agricultural machine side inputs 110 which may be provided with agricultural machine side analogue to digital converters 114. The agricultural machine side control system 102 is further connected to the agricultural machine 10 by way of agricultural machine side outputs 112 which may be provided with agricultural machine side digital to analogue converters 116. The attachment side control system 152 is connected to the attachment 18 by way of attachment side inputs 160 which may be provided with attachment side analogue to digital converters 164. The attachment side control system 152 is further connected to the attachment 18 by way of attachment side outputs 162 which may be provided with attachment side digital to analogue converters 166.

In this way, using the agricultural machine side interface 100 and attachment side interface 150 of the wireless attachment connection 98, and using inductively coupled communication, electronic information and commands regarding attachment height, row guidance, reel position, flotation pressure, and attachment type, as non-limiting examples, may be exchanged between the agricultural machine side control system 102 and the attachment side control system 152. Additionally, the attachment side control system 152 may provide the agricultural machine side control system 102 with software drivers for operating coils, actuators, or motors (not shown) used in the attachment 18. One or more of the agricultural machine side analogue to digital converters 114 may further be provided with load resistors 122 in order to allow the agricultural machine side control system to detect when the coils, actuators, or motors used in the attachment 18 should be activated. One or more of the attachment side outputs 162 of the attachment side control system 152 may be provided with high power DC circuitry 174, in order to operate one or more solenoids, motors, actuators, or lights, as non-limiting examples, associated with the attachment 18.

The attachment side control system 152 may further provide the agricultural machine side control system 102 with specific identifying information regarding the attachment 18, such as attachment type, model, and serial number, thereby allowing the use of various attachments 18 without requiring the operator to manually reconfigure the attachment type in the agricultural machine side control system 102 when changing attachments 18. This identifying information may be stored in Electrically Erasable Programmable Read-Only Memory (EEPROM) storage (not shown) in the attachment side control system 152. The attachment side control system 152 may also be provided with an attachment hour meter 172, accumulated hour information from which may also be provided to the agricultural machine side control system 102 using the wireless attachment connection 98, thereby allowing for more accurate tracking of accumulated operating hours on the attachment 18.

In order to transmit power wirelessly between the agricultural machine 10 and the attachment 18, the agricultural machine side interface 100 of the wireless attachment connection 98 is provided with an agricultural machine primary coil 118. The attachment side interface 150 of the wireless attachment connection 98 is provided with an attachment secondary coil 168. When the attachment 18 is attached to the agricultural machine 10, for example when a header 18 is attached to the feeder housing 20 of the combine 10, the agricultural machine primary coil 118 engages with or is brought into close proximity with the attachment secondary coil 168. A direct current (DC) to alternating current (AC) converter 120 converts the agricultural machine DC power, such as 12 or 24 volts DC, to AC suitable to operate the agricultural machine primary coil 118, which then transmits that power to the attachment secondary coil 168 through inductance. The AC power from the attachment secondary coil 168 is then converted back to DC by an attachment AC to DC rectifier converter 170, which may include a voltage regulator, for use by the attachment side control system 152 and other electrical systems of the attachment 18. Note that the embodiment of the invention illustrated in FIGS. 2 and 3 show the agricultural machine primary coil 118, in the form of a paddle, connected to the agricultural machine 10 and the attachment secondary coil 168, in the form of a port, connected to the attachment 18. However, it is contemplated that embodiments of the invention include a coil paddle connected to the attachment 18 and a coil socket connected to the agricultural machine 10, thereby performing the same function of transmitting electrical power from the agricultural machine 10 to the attachment 18, with the coil socket functioning as the primary coil and the coil paddle functioning as the secondary coil. It is further contemplated that embodiments of the invention include the agricultural machine primary coil 118 and the attachment secondary coil 168 in the form of flat plates, as mentioned previously.

The agricultural machine side control system 102 may be provided with an agricultural machine side network transceiver 104, which may be a Closed Area Network (CAN) transceiver, an Ethernet transceiver, a Local Interconnect Network (LIN) transceiver, or a proprietary network transceiver, as non-limiting examples, thereby allowing for communication between the agricultural machine side control system 102 and other electronic systems (not shown) within the agricultural machine 10. Similarly, the attachment side control system 152 may be provided with an attachment side network transceiver 154, allowing for communication between the attachment side control system 152 and other electronic systems (not shown) within the attachment 18.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural machine and attachment combination having a wireless attachment connection for transmitting electronic information, commands, and electric power between the agricultural machine and the attachment, the wireless attachment connection comprising:

an agricultural machine side control system connected to the agricultural machine by at least one agricultural machine side input and at least one agricultural machine side output, and an attachment side control system connected to the attachment by at least one attachment side input and at least one attachment side output;

said agricultural machine side control system having an agricultural machine side network transceiver for communicating between the agricultural machine side control system and the agricultural machine, and said attachment side control system having an attachment side network transceiver for communicating between the attachment side control system and the attachment;

an agricultural machine side interface connected to said agricultural machine side control system having at least one agricultural machine side inductively coupled communication receiver and at least one agricultural machine side inductively coupled communication transmitter;

an attachment side interface connected to said attachment side control system having at least one attachment side inductively coupled communication receiver and at least one attachment side inductively coupled communication transmitter;

said agricultural machine side inductively coupled communication transmitter and said attachment side inductively coupled communication receiver cooperating to transmit electronic information and commands from said agricultural machine side control system to said attachment side control system;

said attachment side inductively coupled communication transmitter and said agricultural machine side inductively coupled communication receiver cooperating to transmit electronic information from said attachment side control system to said agricultural machine side control system;

a primary coil connected to the agricultural machine for transmitting power to the attachment; and a secondary coil connected to the attachment for receiving power from the agricultural machine, said primary coil and said secondary coil cooperating to transmit power from the agricultural machine to the attachment using inductance.

2. The agricultural machine and attachment combination of claim 1, wherein:
said primary coil being in the form of one of a paddle, a port, and a flat plate; and
said secondary coil being in the form of one of a port, a paddle, and a flat plate.

3. The agricultural machine and attachment combination of claim 1, further comprising:
a direct current (DC) to alternating current (AC) converter connected to the agricultural machine and to said primary coil, said DC to AC converter operable to convert DC power provided by the agricultural machine to AC power to operate said primary coil;
an AC to DC rectifier converter and voltage regulator connected to the attachment and to said secondary coil, said AC to DC rectifier converter and voltage regulator operable to convert AC power received by said secondary coil to DC power for use by said attachment side control system.

4. The agricultural machine and attachment combination of claim 1, wherein:
said at least one agricultural machine side input having an analogue to digital converter;
said at least one agricultural machine side output having a digital to analogue converter;
said at least one attachment side input having an analogue to digital converter; and
said at least one attachment side output having a digital to analogue converter.

5. The agricultural machine and attachment combination of claim 1, wherein:
said wireless attachment connection being operable to communicate electronic information and commands between said agricultural machine side control system and said attachment side control system, including at least one of a commanded attachment height, a current attachment height, row guidance, a commanded reel position, a current reel position, a commanded flotation pressure, a current flotation pressure, an attachment type, an attachment model, an attachment serial number, and current attachment hours.

6. The agricultural machine and attachment combination of claim 5, wherein:
said attachment model and said attachment serial number being stored in Electrically Erasable Programmable Read-Only Memory (EEPROM) storage in said attachment side control system.

7. The agricultural machine and attachment combination of claim 5, wherein:
said attachment side control system includes an attachment hour meter configured for providing accumulated operating hour information of the attachment which is communicated to the agricultural machine side control system in order to accurately track accumulated operating hours.

8. The agricultural machine and attachment combination of claim 1, wherein:
said wireless attachment connection being operable to communicate software drivers between said agricultural machine side control system and said attachment side control system for operating at least one of a coil, actuator, and motor used in said attachment.

9. A wireless attachment connection for transmitting electronic information, commands, and power between an agricultural machine and an attachment, the wireless attachment connection comprising:
an agricultural machine side control system connected to the agricultural machine by at least one agricultural machine side input and at least one agricultural machine side output, and an attachment side control system connected to the attachment by at least one attachment side input and at least one attachment side output;
said agricultural machine side control system having an agricultural machine side network transceiver for communicating between the agricultural machine side control system and the agricultural machine, and said attachment side control system having an attachment side network transceiver for communicating between the attachment side control system and the attachment;
an agricultural machine side interface connected to said agricultural machine side control system having at least one agricultural machine side inductively coupled communication receiver and at least one agricultural machine side inductively coupled communication transmitter;
an attachment side interface connected to said attachment side control system having at least one attachment side inductively coupled communication receiver and at least one attachment side inductively coupled communication transmitter;
said agricultural machine side inductively coupled communication transmitter and said attachment side inductively coupled communication receiver cooperating to transmit electronic information and commands from said agricultural machine side control system to said attachment side control system;
said attachment side inductively coupled communication transmitter and said agricultural machine side inductively coupled communication receiver cooperating to transmit electronic information from said attachment side control system to said agricultural machine side control system;
a primary coil connected to the agricultural machine for transmitting power to the attachment; and
a secondary coil connected to the attachment for receiving power from the agricultural machine, said primary coil and said secondary coil cooperating to transmit power from the agricultural machine to the attachment using inductance.

10. The wireless attachment connection of claim 9, wherein:
said primary coil being in the form of one of a paddle, a port, and a flat plate; and
said secondary coil being in the form of one of a port, a paddle, and a flat plate.

11. The wireless attachment connection of claim 9, further comprising:
direct current (DC) to alternating current (AC) converter connected to the agricultural machine and to said primary coil, said DC to AC converter operable to convert DC power provided by the agricultural machine to AC power to operate said primary coil;
an AC to DC rectifier converter and voltage regulator connected to the attachment and to said secondary coil, said AC to DC rectifier converter and voltage regulator operable to convert AC power received by said secondary coil to DC power for use by said attachment side control system.

12. The wireless attachment connection of claim 9, wherein:
said at least one agricultural machine side input having an analogue to digital converter;

said at least one agricultural machine side output having a digital to analogue converter;
said at least one attachment side input having an analogue to digital converter; and
said at least one attachment side output having a digital to analogue converter.

13. The wireless attachment connection of claim 9, wherein:
said wireless attachment connection being operable to communicate electronic information and commands between said agricultural machine side control system and said attachment side control system, including at least one of a commanded attachment height, a current attachment height, row guidance, a commanded reel position, a current reel position, a commanded flotation pressure, a current flotation pressure, an attachment type, an attachment model, an attachment serial number, and current attachment hours.

14. The wireless attachment connection of claim 13, wherein:
said attachment model and said attachment serial number being stored in Electrically Erasable Programmable Read-Only Memory (EEPROM) storage in said attachment side control system.

15. The wireless attachment connection of claim 13, wherein:
said attachment side control system includes an attachment hour meter configured for providing accumulated operating hour information of the attachment which is communicated to the agricultural machine side control system in order to accurately track accumulated operating hours.

16. The wireless attachment connection of claim 9, wherein:
said wireless attachment connection being operable to communicate software drivers between said agricultural machine side control system and said attachment side control system for operating at least one of a coil, actuator, and motor used in said attachment.

17. A method of transmitting electronic information, commands, and electric power between an agricultural machine and an attachment, comprising the steps of:
providing an agricultural machine side control system connected to the agricultural machine by at least one agricultural machine side input and at least one agricultural machine side output, and an attachment side control system connected to the attachment by at least one attachment side input and at least one attachment side output, said agricultural machine side control system having an agricultural machine side network transceiver for communicating between the agricultural machine side control system and the agricultural machine, and said attachment side control system having an attachment side network transceiver for communicating between the attachment side control system and the attachment;
providing a wireless attachment connection having an agricultural machine side interface connected to said agricultural machine side control system, said agricultural machine side interface having at least one agricultural machine side inductively coupled communication receiver and at least one agricultural machine side inductively coupled communication transmitter, said wireless attachment connection further having an attachment side interface connected to said attachment side control system, said attachment side interface having at least one attachment side inductively coupled communication receiver and at least one attachment side inductively coupled communication transmitter;
using said agricultural machine side inductively coupled communication transmitter and said attachment side inductively coupled communication receiver to transmit electronic information and commands from said agricultural machine side control system to said attachment side control system;
using said attachment side inductively coupled communication transmitter and said agricultural machine side inductively coupled communication receiver to transmit electronic information from said attachment side control system to said agricultural machine side control system;
said electronic information and commands including at least one of a commanded attachment height, a current attachment height, row guidance, a commanded reel position, a current reel position, a commanded flotation pressure, a current flotation pressure, an attachment type, an attachment model, an attachment serial number, current attachment hours, and software drivers;
providing a primary coil connected to the agricultural machine;
providing a secondary coil connected to the attachment; and
using said primary coil and said secondary coil to transmit power between the agricultural machine and the attachment by way of inductance.

18. The method of claim 17, wherein:
a direct current (DC) to alternating current (AC) converter is connected to the agricultural machine and to said primary coil, said DC to AC converter operable to convert DC power provided by the agricultural machine to AC power to operate said primary coil;
an AC to DC rectifier converter and voltage regulator is connected to the attachment and to said secondary coil, said AC to DC rectifier converter and voltage regulator operable to convert AC power received by said secondary coil to DC power for use by said attachment side control system;
said at least one agricultural machine side input having an analogue to digital converter;
said at least one agricultural machine side output having a digital to analogue converter;
said at least one attachment side input having an analogue to digital converter; and
said at least one attachment side output having a digital to analogue converter.

* * * * *